United States Patent [19]

Ferrell et al.

[11] Patent Number: 4,517,639
[45] Date of Patent: May 14, 1985

[54] FAULT SCORING AND SELECTION CIRCUIT AND METHOD FOR REDUNDANT SYSTEM

[75] Inventors: Philip J. Ferrell, Seattle; Alan D. Stern, Bellevue; Melvin D. McFarland, Pacific, all of Wash.

[73] Assignee: The Boeing Company, Seattle, Wash.

[21] Appl. No.: 377,854

[22] Filed: May 13, 1982

[51] Int. Cl.³ .............................................. G06F 11/16
[52] U.S. Cl. ................................... 364/186; 244/194; 364/187; 371/9
[58] Field of Search .............................. 364/184–187, 364/131–134; 371/8, 9, 36, 16, 68; 244/194, 195

[56] References Cited

U.S. PATENT DOCUMENTS

| | | |
|---|---|---|
| 3,471,686 | 10/1969 | Connell . |
| 3,476,922 | 11/1969 | Yiotis . |
| 3,593,307 | 7/1971 | Gouge, Jr. et al. . |
| 3,614,401 | 10/1971 | Lode . |
| 3,618,015 | 11/1971 | Homonick . |
| 3,654,603 | 4/1972 | Gunning et al. ............ 371/36 X |
| 3,665,173 | 5/1972 | Bouricius et al. . |
| 3,678,467 | 7/1972 | Nussbaum et al. . |
| 3,783,250 | 1/1974 | Fletcher et al. . |
| 3,800,139 | 3/1974 | Clark . |
| 3,805,235 | 4/1974 | Foster et al. ................ 371/36 |
| 3,829,668 | 8/1974 | Noumi et al. . |
| 3,848,116 | 11/1974 | Moder et al. . |
| 4,130,241 | 12/1978 | Meredith et al. . |
| 4,270,168 | 5/1981 | Murphy et al. . |

FOREIGN PATENT DOCUMENTS

1444513  8/1976  Fed. Rep. of Germany .

OTHER PUBLICATIONS

Rennels, David A., "Architectures for Fault-Tolerant Spacecraft Computers", pp. 1255–1268, Oct. 1978.

Depledge, P. G. et al., "Fault-Tolerant Microcomputer Systems for Aircraft", pp. 206–220, Mar. 1977.

Primary Examiner—Joseph F. Ruggiero
Attorney, Agent, or Firm—Christensen, O'Connor, Johnson & Kindness

[57] ABSTRACT

In a triplex redundant digital control system, one of three computer units is selected for controlling a digital flight control system by using fault scoring and selection logic circuitry that responds to discrete signals produced by the computer units that represent both self-test and cross-test information on the health of the three available units. The self-test and cross-test discrete information signals are received and processed by the selection logic circuit in accordance with a fault-scoring scheme in which the self-test scores are accorded different and, in particular, greater weight than the cross-test scores and a computer unit exhibiting the lowest combined self- and cross-test fault score is selected as the computer in control. The circuitry also includes memory devices for storing the fault scores associated with previous fault conditions so that a previously unfailed computer unit is selected over a previously failed but currently healthy computer. The memory devices are cleared whenever all three computer modules have scored a fault condition of equal weight such that transient failures do not cause permanent disablement of a computer unit, rather the temporarily faulty unit is allowed to recover and to be brought back on line if needed. To minimize switching, the selection logic causes a new selection only if a computer unit with a lower fault score is available. For simplicity and reliability, the fault scoring and selection logic functions of the circuitry are performed by read-only memories (ROMs) and the memory function is implemented by resettable latches.

25 Claims, 8 Drawing Figures

Fig. 3.

| FCC SOURCE | FAULT SIGNAL IDs | | |
|---|---|---|---|
| | FCC | FCC | FCC |
| FCC | 1,1 | 1,2 | 1,3 |
| FCC | 2,1 | 2,2 | 2,3 |
| FCC | 3,1 | 3,2 | 3,3 |

NOTE: FAULT WHEN SETS i,j = 1; HEALTHY WHEN i,j = 0
SELF-TEST IDs = 1,1; 2,2; 3,3
CROSS-TEST IDs = 1,2; 1,3; 2,1; 2,3; 3,1; 3,2

- SINGLE FAULT SCORE EQUATIONS:

$$S1 = (\overline{2.2} - 2.1) + (\overline{3.3} - 3.1) + (S1' - \overline{RS})$$
$$S2 = (\overline{1.1} - 1.2) + (\overline{3.3} - 3.2) + (S2' - \overline{RS})$$
$$S3 = (\overline{1.1} - 1.3) + (\overline{2.2} - 2.3) + (S3' - \overline{RS})$$

- DOUBLE FAULT SCORE EQUATIONS:

$$D1 = (1.1) + (\overline{2.2} - 2.1 - \overline{3.3} - 3.1) + (D1' - \overline{RD})$$
$$D2 = (2.2) + (\overline{1.1} - 1.2 - \overline{3.3} - 3.2) + (D2' - \overline{RD})$$
$$D3 = (3.3) + (\overline{1.1} - 1.3 - \overline{2.2} - 2.3) + (D3' - \overline{RD})$$

WHERE:
- $Si$ = SINGLE FAULT ON COMPUTER $i$
- $Di$ = DOUBLE FAULT ON COMPUTER $i$
- $RS$ = RESET SINGLE-SCORE LATCH
- $RD$ = RESET DOUBLE-SCORE LATCH
- $Si'$ = PREVIOUS FAULT STATE OF $Si$
- $Di'$ = PREVIOUS FAULT STATE OF $Di$

Fig. 4.

| LATCH FAULT SCORE | FCC's NOT ALLOWED | SELECTION WORD | HEXIDECIMAL VALUE OF SELECTION OUTPUT | CONTROL SWITCHING OUTPUT |
|---|---|---|---|---|
| D3 D2 D1 S3 S2 S1 | | B1 B2 B3 B4 | | C1 C2 |
| 0 0 0 0 0 0 | — | 1 1 1 1 | F | — — |
| 0 0 0 0 0 1 | 1 | 1 1 0 1 | D | 1 0 |
| 0 0 0 0 1 0 | 2 | 1 1 1 0 | E | 1 1 |
| 0 0 0 0 1 1 | 1,2 | 0 1 1 1 | 7 | 1 1 |
| 0 0 0 1 0 0 | 3 | 1 0 1 1 | B | 0 1 |
| 0 0 0 1 0 1 | 1,3 | 1 0 0 1 | 9 | 1 0 |
| 0 0 0 1 1 0 | 2,3 | 1 0 1 0 | A | 0 1 |
| 0 0 0 1 1 1 | — | 1 1 1 1 | F | — — |
| 0 0 1 0 0 X | 1 | 1 1 0 1 | D | 1 0 |
| 0 0 1 0 1 X | 1,2 | 0 1 1 1 | 7 | 1 1 |
| 0 0 1 1 0 X | 1,3 | 1 0 0 1 | 9 | 1 0 |
| 0 0 1 1 1 X | 1 | 1 1 0 1 | D | 1 0 |
| 0 1 0 0 X 0 | 2 | 1 1 1 0 | E | 1 1 |
| 0 1 0 0 X 1 | 1,2 | 0 1 1 1 | 7 | 1 1 |
| 0 1 0 1 X 0 | 2,3 | 1 0 1 0 | A | 0 1 |
| 0 1 0 1 X 1 | 2 | 1 1 1 0 | E | 1 1 |
| 0 1 1 0 X X | 1,2 | 0 1 1 1 | 7 | 1 1 |
| 0 1 1 1 X X | 1,2 | 0 1 1 1 | 7 | 1 1 |
| 1 0 0 X 0 0 | 3 | 1 0 1 1 | B | 0 1 |
| 1 0 0 X 0 1 | 1,3 | 1 0 0 1 | 9 | 1 0 |
| 1 0 0 X 1 0 | 2,3 | 1 0 1 0 | A | 0 1 |
| 1 0 0 X 1 1 | 3 | 1 0 1 1 | B | 0 1 |
| 1 0 1 X 0 X | 1,3 | 1 0 0 1 | 9 | 1 0 |
| 1 0 1 X 1 X | 1,3 | 1 0 0 1 | 9 | 1 0 |
| 1 1 0 X X 0 | 2,3 | 1 0 1 0 | A | 0 1 |
| 1 1 0 X X 1 | 2,3 | 1 0 1 0 | A | 0 1 |
| 1 1 1 X X X | — | 1 1 1 1 | F | — — |

FCC DECODE SELECTION LOGIC

| FCC SELECTED | NO SWITCH | FCC SELECTION CODE |
|---|---|---|
| FCC NO. 1 | F | B,A = 0,1 |
| FCC NO. 2 | F | D,9 = 1,0 |
| FCC NO. 3 | F | E,7 = 1,1; 0,0 |

0 = NO FAILURE
1 = FAULT
X = DON'T CARE (MAY BE 1 OR 0)

Fig. 5.

IUS OVER INTER-FCC COMMUNICATION LINK

FCC1C COMMAND TO ALL ACTUATORS

FCC-IOC PAIR WITH AUTONOMOUS IOC

FAULT SCORING AND SELECTION CIRCUIT AND METHOD FOR REDUNDANT SYSTEM

BACKGROUND OF THE INVENTION

The invention relates to redundant control systems in which a plurality of redundantly arranged control units, such as computers, are monitored for fault conditions by circuitry that automatically responds to one or more failures by selecting a nonfaulty unit (or units) to control the system.

Such redundant control systems are used in a number of environments where failsafe operation is essential to the reliability and performance of the equipment. Digital flight controls in modern-day commercial and military aircraft are a prime example of one important application of such redundant systems. Other applications include traffic control, industrial plant or process control systems, spacecraft instrumentation, data processing systems, and telephone switching equipment.

Digital flight control systems must, for apparent reasons, meet high reliability requirements. Normally, these requirements can be met only with redundant hardware, since it is virtually impossible to totally eliminate malfunctions of individual hardware components. In the management of redundant systems, there is a problem in distinguishing between operational and failed units and in selecting a proper configuration from the available, or remaining, healthy units. An automatic means and method for making this selection may be performed by logic circuitry that receives failure information signals from the redundant computers or other control units and makes the proper selection based on such information.

In developing the logic by which the selection circuitry chooses one control unit over another, a common design approach is to monitor the output states of the redundant control units and, by comparison voting of the outputs, determine by majority rule any faulty control units that should be excluded from participating in the control of the system. A variation of this logic scheme is to provide means associated with each control unit for cross-checking the health status of the remaining units and again voting the cross-checks so that when a majority of the control units determines that one or more minority control units have failed, those failed units will be excluded from system control. Systems based on such majority voting schemes work well as long as a majority of control units are available for voting down a minority of faulty units. When, however, the vote is even, such as where two remaining control units vote against each other as a result of cross-checks, then the system is at loggerheads and is unable to make a meaningful selection from the available fault information.

Other proposed designs provide selection logic schemes that operate to select a certain control unit given a predetermined set of input fault conditions, even though another control unit is currently in control and has the same fault status. Such fixed, unflexible operating logic results in excessive switching between control units of equal probability of failure. Changing the unit in control, when unjustified by relative fault conditions, increases rather than decreases the likelihood of a malfunction in the overall system.

Still another shortcoming of some existing selection logic circuits is their inability to recover from transient faults. Momentary fault conditions, including apparent (but not real) faults, may occur even though the monitored control unit is basically in good operating order. If the selection logic permanently excludes (deselects) a control unit because of a transient fault, the overall reliability of the redundant system rapidly deteriorates because the excluded control unit can no longer participate in a voting or other comparison scheme. On the other hand, if units are allowed to be brought back on line after they have recovered from a transient failure, then the overall system is better able to respond to future equipment failures.

SUMMARY

Briefly, the preferred embodiment of the invention as disclosed herein incorporates fault scoring and selection logic circuitry and method in a redundant control system to monitor the collective fault status of a plurality of redundant control units, such as computers, processors, controllers, or the like, and to select for the control task, the unit or units that are determined to have the most healthy condition (conversely, exhibiting the least fault score). The comparative health of the available units is automatically determined by a unique fault scoring and selection logic scheme that combines self-test and cross-test signal information from the various control units. A self-test information signal is produced by each of the individual control units and represents the results of a self-test performed on the internal hardware and operating condition of that particular unit. Cross-test information signals represent the results of a test or other check performed by one control unit on the hardware and operating condition of another unit (hence, cross).

The scoring and selection logic scheme accords a different, and in the preferred embodiment, a greater scoring weight to the self-test results than to the individual cross-test results because of greater intrinsic reliability of the self-testing. For example, in the disclosed embodiment, a negative self-test (indicating that a particular unit has tested itself as failed) is given twice the scoring weight as a negative cross-test (indicating that the subject unit has been judged faulty by another control unit). The various self- and cross-tests from the plurality of control units are combined according to the differently weighted scoring scheme and the collective scoring results for the various units are compared to cause a selection to be made from among the control units of a unit or units having the lowest available fault score, or conversely stated, those units having the higher fault scores are excluded (deselected).

Another principle of the invention is that the history of unit failure scores is stored in memory devices to allow a comparison of the historical scores of the units and to make a selection based on choosing the most healthy unit taking into account previous as well as present faults. A control unit not having a history of a previous failure will be selected over a unit that has had a prior fault. Further, in accordance with this fault-storing feature, the memory devices are reset when all the control units have incurred corresponding fault conditions, inasmuch as the information value derived from the failure history is no longer meaningful in the selection process.

Preferably, the foregoing principles are embodied in circuitry that incorporates one or more of the following additional features. The circuitry and associated method are organized into two sections: a scoring logic circuit (which includes the above-mentioned memory) and a selection logic circuit. As an example, in the case of a triplex system (for managing three redundant control units), each of the three control units produces a self-test input signal (a discrete signal), indicating whether the self-test failed or passed, and a plurality of two cross-test signals (also discrete signals), one for each of the remaining two units respectively indicating whether the other control units check out as healthy or faulty pursuant to the cross-testing. The discrete condition inputs from all of the control units, consisting of three discrete self-test signals and six discrete cross-test signals, are applied to the scoring logic circuit. The scoring logic combines the various test signals into a fault score for each control unit, and in doing so assigns a double scoring weight to each self-test fault and a single scoring weight to each cross-test fault. Two cross-test faults against a subject control unit are thus scored as a double fault and equivalent to a self-test fault against that particular time. The single- and double-fault scores are separately registered by the scoring logic circuit, and single- and double-fault latches serve as memory devices for storing the history of previous fault conditions.

Furthermore, since in the preferred embodiment a control unit that has failed its self-test is unlikely to give an accurate opinion of the condition of another unit pursuant to the cross-testing, the cross-test signals generated by a control unit that has failed its self-test, are ignored.

The selection logic circuit of the preferred embodiment receives the health score information from the latched scores, and makes a selection as follows. A unit is excluded from selection if it has a greater combined fault score against it, than other units. Stated conversely, a unit having the lowest combined fault score is selected, and where two or more units share an equally low fault score, one particular unit is selected according to predetermined but arbitrary selection decisions to ensure that a positive selection of one unit is always made on the basis of the current and latched fault conditions.

Furthermore, the selection logic circuitry of the preferred embodiment will not cause a change in selection unless a control unit having a lower combined fault score is available. Thus, even though the selection logic circuitry provides, in general, for a particular control unit to be selected in response to changing input fault conditions, an overriding logic feature prevents the selection circuitry from choosing a different control unit when there are no other units available with a lower latched fault score.

Additionally, the selection logic circuit operates to make a selection through a switching circuit in which all possible failure modes of such switching circuit and the scoring and selection logic result in a positive selection being made of one of the control units so that a single point failure at the scoring and selection circuitry is not possible.

Also, in accordance with the preferred embodiment, the scoring logic circuit including the memory latches, is organized to produce a multibit binary scoring signal that encodes in binary form the combined single- and double-fault scores in accordance with the foregoing logic rules. This multibit binary scoring signal is then converted or translated by the selection logic circuit, in accordance with the above-stated selection logic rules, to produce a multibit binary selection signal that causes the desired control unit to command the system.

Still further in accordance with the preferred embodiment, the scoring logic of the scoring logic circuit is implemented by a read-only memory (ROM) that combines the input fault discrete signals in accordance with Boolean relationships that are derived from the above-noted scoring logic features. Similarly, the selection logic of the selection logic circuit is implemented by a ROM. The above-mentioned memory latches are cooperatively arranged at the output of the scoring logic ROM for feeding the latched scores to the selection logic ROM. The ROMs provide a low-cost, yet exceedingly reliable circuit for performing the various logic rules in keeping with the overall objective of improved system reliability.

To provide a complete disclosure of the invention, reference is made to the appended drawings and following description of one particular and preferred embodiment.

BRIEF DESCRIPTION OF THE DRAWINGS

FIG. 3 is a matrix chart that identifies in notation form, the source and function of a plurality of discrete signals resulting from three self-tests and six cross-tests performed by the flight control computer units of FIG. 1;

FIG. 4 shows the Boolean relationships that are used to derive a multibit binary fault scoring signal representing, collectively, the relative health status of all of the computer units, including a Boolean factor derived from the fault memory latches of the circuit of FIG. 2;

FIG. 5 is a decoding chart which correlates the latched fault scores resulting from the Boolean relationships of FIG. 4 with the output selection signal, which is also generated in a binary format, and which is in turn converted into a control switching output that effects the selection from among the three available flight control computers of FIG. 1;

DETAILED DESCRIPTION

Figure 1:
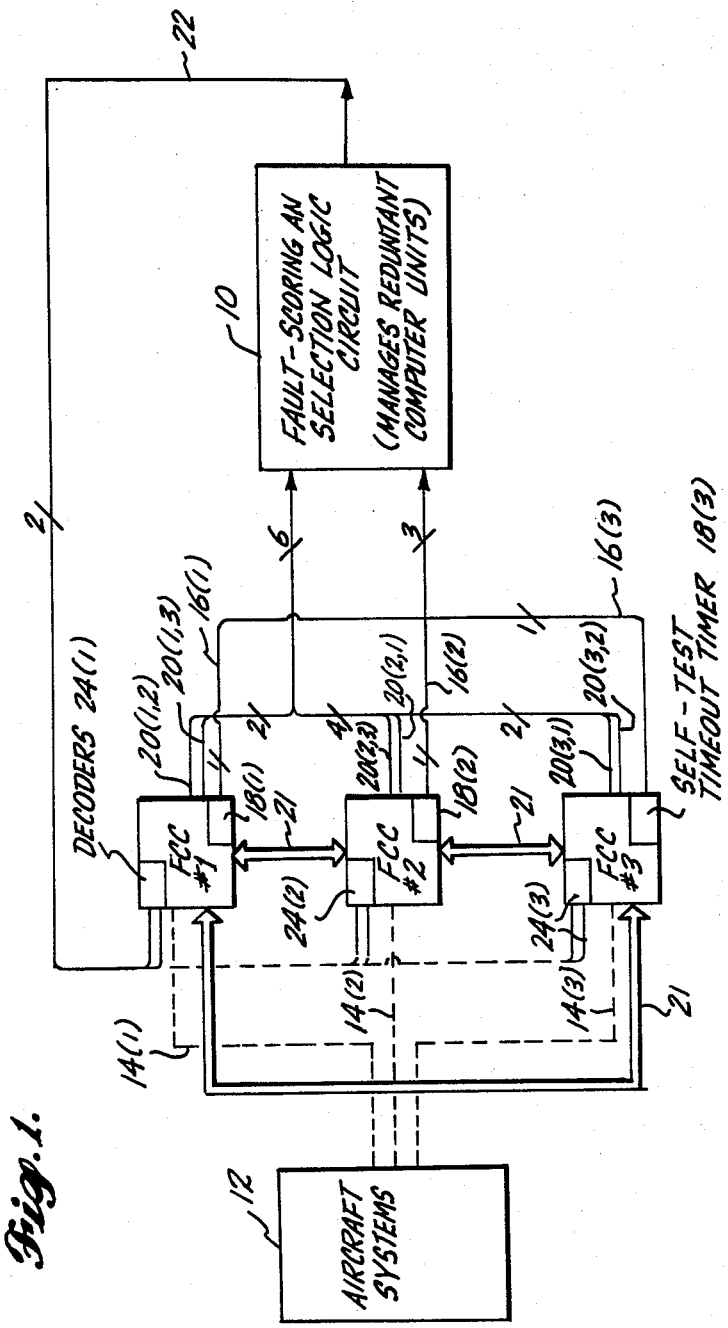
FIG. 1 is a generalized block diagram showing the fault scoring and selection circuit for managing a plurality of flight control computers in a triplex redundant system, in which one of the flight control computers is selected to control the aircraft systems.

FIG. 1 shows a generalized block diagram in which the invention is embodied in a fault scoring and selection logic circuit 10 for a triplex redundant flight control system. A plurality of redundant flight control computers (FCCs) #s 1, 2, and 3, are managed by circuit 10 for failsafe control of the aircraft systems 12 via computer-to-systems control links indicated by dotted lines 14(1), 14(2), and 14(3). Each of FCCs #s 1, 2, and 3 is constructed in accordance with any of numerous known flight control system designs so as to be individually capable of automatically governing the airplane's flight systems. The FCCs #s 1, 2 and 3 are also constructed in accordance with digital circuit designs known, per se, to provide output signals that represent the results of both cross-testing and self-testing.

For example, FCC #1 includes an output lead 16(1) that produces a self-test discrete signal of positive or negative significance, depending upon whether FCC #1 passes or fails a predetermined, internal self-test that is built or programmed into the flight control computer. Similarly, FCC #2 produces a self-test discrete signal on lead 16(2) and FCC #3 produces a self-test discrete signal on lead 16(3). These leads are fed as separate inputs indicated by the notation/3, to an input interface with circuit 10. Preferably, and as described more fully herein below, each self-test signal is generated by a resettable timeout timer, see timers 18(1), 18(2), and 18(3), which is incorporated into the flight control computer as a dedicated circuit. Each FCC is constructed or programmed so that if it successfully completes the self-test, the associated timer 18(1), 18(2), or 18(3) will be reset and will in turn produce a positive discrete signal on the associated self-test output lead 16(1), 16(2), or 16(3). If the FCC fails to pass its self-test, then the corresponding timeout timer will not be reset in accordance with a predetermined timing cycle, and the associated self-test output lead will change to a negative discrete signal value.

In parallel with the self-test discrete signals, each FCC generates a plurality of cross-test signals, one for each of the other two flight control computers. These cross-test signals appear on leads 20(1, 2) as FCC #1's opinion of the health of FCC #2; on lead 20(1, 3) as FCC #1's opinion of the health of FCC #3; and so forth, on leads 20(2, 1); 20(2, 3); 20(3, 1); and 20(3, 2). As described more fully herein, the cross-tests may take the form of one of several suitable alternatives known per se, such as to cause one FCC to request from another FCC that the latter perform a simple program for which the answer has been predetermined and stored in the former for comparison. The inter-FCC communication is carried out over inter-FCC data and control command links 21. Also, links 21 enable synchronization and initialization of the control channels 14(1, 2 and 3). A return of an incorrect answer over links 21 indicates a cross-test failure of the tested FCC. Like the self-test results, each of the cross-test results is in the form of a discrete signal representing either a positive or negative result. For the triplex system shown in FIG. 1, a total of six cross-test signals are thus developed and these are shown by the notation/6 as a bundle of six leads connected as inputs to circuit 10 in parallel with the three self-test leads.

Circuit 10 functions as summarized above, to provide weighing and to combine the test results to produce fault scores for the redundant flight control computers, and then perform a selection from the fault scores in accordance with a predetermined selection logic scheme. The flight control computer selected by circuit 10 is automatically designated and enabled in this embodiment by a two-bit binary switching signal fed over leads 22 as an output of circuit 10 to FCCs #s 1, 2, and 3 as shown. The two-bit switching signal on leads 22 is decoded by each of the FCCs in dedicated decoders 24(1), 24(2), and 24(3). When a particular flight control computer has been selected, the associated decoder will respond to the selection signal on leads 22 and enable that particular FCC to operate aircraft systems 12 to the exclusion of the other two FCCs. Since one of the flight control computers is selected as the computer-in-control, circuit 10 is sometimes called a computer-in-control logic circuit.

Fault Scoring and Selection Logic Circuits

Figure 2:
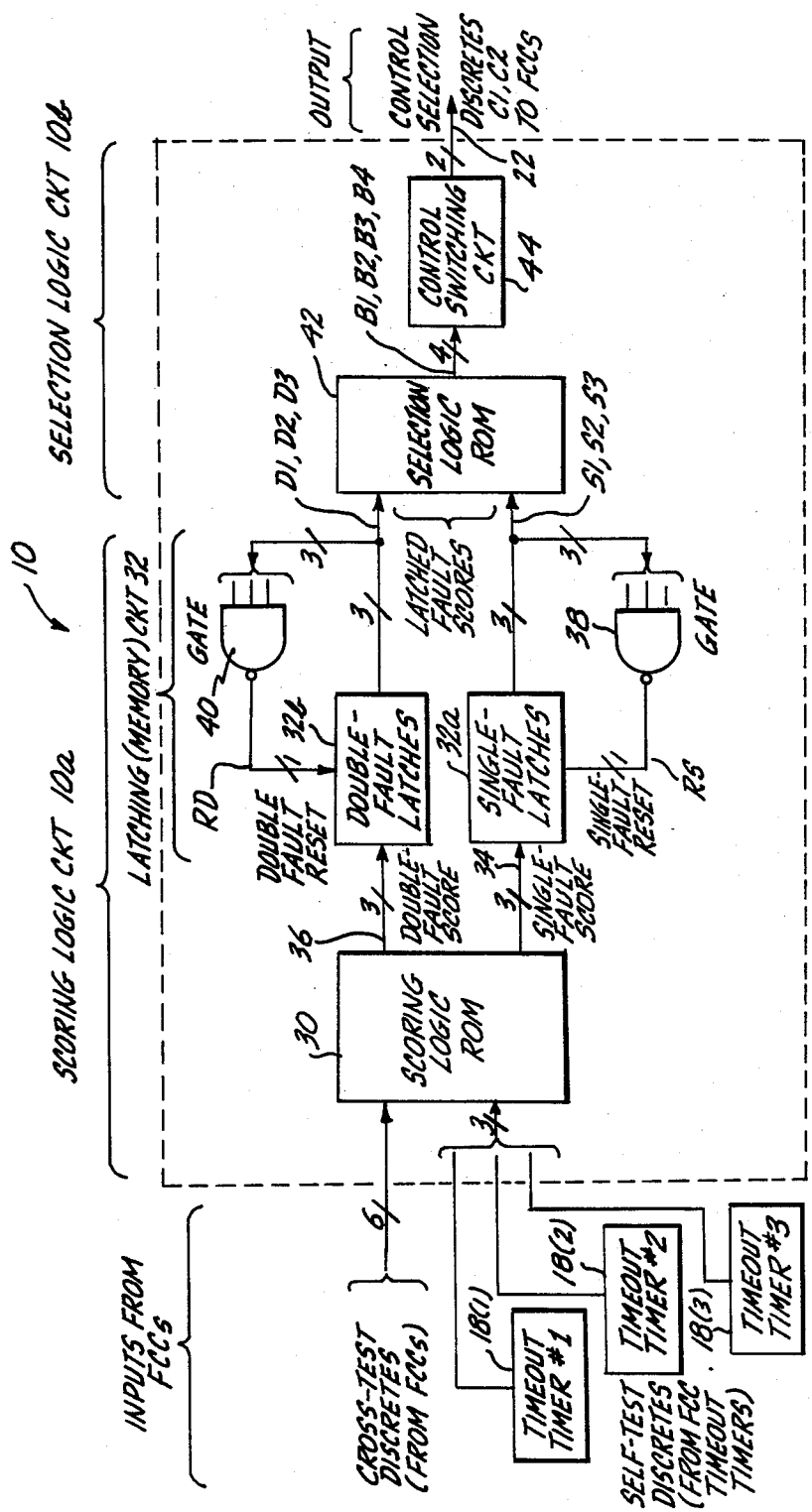
FIG. 2 is a detailed block diagram of the fault scoring and selection logic circuit shown generally in FIG. 1 and illustrating how the circuit interface with the redundant flight control computers.

With reference to FIG. 2, the preferred embodiment of circuit 10 incorporates a scoring logic circuit 10a and a selection logic circuit 10b. Circuit 10a receives the three self-test discrete signals and the six cross-test discrete signals from FCCs #s 1, 2, and 3, as described above in connection with FIG. 1, and combines the fault indications resulting from these various test signals into a collective fault score that reflects the relative health of the FCCs. The scoring logic for circuit 10a is performed by a scoring logic read-only memory (ROM) 30. Fault scores based on present input signal conditions are developed by the scoring logic within ROM 30 and are fed to a latching (memory) circuit 32, which, in accordance with the above-mentioned operation latches (memorizes) the fault scores. For this memory function, circuit 32 includes a plurality (three in this embodiment) of single-fault latches 32a, one for each of the three redundant flight control computers, and a plurality (three in this case) double-fault latches 32b, again, one for each of the three flight control computers. Latches 32a receive single-fault scores over three separate output leads 34 from scoring logic ROM, each such lead carrying a discrete binary signal representing the absence or presence of a single-fault condition registered against an associated one of the three flight control computers, #s 1, 2, and 3. Similarly, double-fault latches 32b are connected over leads 36 to the scoring logic ROM 30 for receiving a plurality of three separate discrete binary signals representing the absence or presence of double-fault scores against the respective flight control computers. Circuit 32 also incorporates reset circuitry in the form of a single-fault reset gate 38 and a double-fault reset gate 40.

Gate 38 has a set of three inputs connected to the corresponding number of outputs from latches 32a and has an output lead labelled RS connected to latches 32a for resetting all three single-fault latches whenever all three latches have stored a single-fault score against the corresponding FCCs #s 1, 2, and 3. The single-fault latch signals are represented by S1, S2, and S3 in FIG. 2.

Similarly, gate 40 has a set of three inputs connected to the corresponding number of output leads from double-fault latches 32b for resetting these latches over a lead labelled RD when gate 40 senses that all three double-fault latch outputs represented by the notation D1, D2, and D3, in FIG. 2, have stored a double-fault score against FCCs #s 1, 2, and 3. Gates 38 and 40 thus serve to provide an AND logic function and, in this particular embodiment, NAND logic devices are used for these gates.

The resulting output from scoring logic 10a consists of a multibit scoring signal (binary word) formed by the bits S1, S2, S3, D1, D2, and D3 in which the bits S1, D1 represent the single- and double-fault scores, respectively, for FCC #1; bits S2, D2 represent the single- and double-fault score for FCC #2; and S3, D3 represent the single- and double-fault scores for FCC #3. In general, an FCC having no single or double fault represents a computer unit that is healthy and available for controlling aircraft systems 12; an FCC scoring a single fault is deemed of questionable health, but would still be selected over FCCs having double faults; and FCCs having double faults are deemed the least healthy and will not be selected unless all three flight control computers have scored a double-fault condition, in which case it is deemed better to select an unhealthy FCC than to completely withdraw FCC control. The scoring scheme is more specifically described below.

The multibit binary scoring word of S1, S2, S3, D1, D2, and D3 is fed to selection logic circuit 10b that translates the multibit score into a two-bit selection signal for outputting on bus 22. For this purpose, circuit 10b includes a selection logic ROM 42 that performs a logic selection from scoring bits S1, S2, S3, D1, D2, and D3 and produces a four-bit selection word represented by B1, B2, B3 and B4 appearing on four separate output leads as indicated by the notation/4 in FIG. 2. This four-bit selection logic output word provides a different binary state for each possible combination of latch fault scores received from scoring logic circuit 10a and is applied to a control switching circuit 44 that functions to encode the four-bit signal B1, B2, B3, and B4, into a two-bit selection signal consisting of discretes C1 and C2.

Scoring and Selection Logic

The scoring logic and memory functions of circuit 10a cooperate with the selection logic of circuit 10b to monitor fault conditions as represented by the above-described input signals and optimally manage the redundant flight control computers down to a selection of one particular computer unit for controlling the system. In effect, then, the scoring and selection logic of circuit 10 manages the triplex system (three FCC units) down to the simplex level. In doing so, circuit 10 embodies the following principles:

(1) The various possible fault conditions of each of the redundant computer units are combined into a fault score for that unit. The fault scores are then compared and, in general, a computer unit exhibiting the lowest fault score will be selected for system control. When the lowest fault score is shared by a plurality of units, then the selection logic of circuit 10 automatically and arbitrarily makes a selection of one particular unit from the equally low fault scoring units. As a related rule of operation, circuit 10 makes a new selection only when a unit having a lower fault score becomes available. This feature eliminates unnecessary and possibly harmful excessive switching among the redundant computer units.

(2) The fault scoring is based on a combination of self-test fault signals and cross-test fault signals.

(3) The combining of the fault conditions is accomplished by a scoring logic scheme in which the self-test conditions are given a scoring weight that is different and, in this embodiment, greater than the scoring weight accorded the cross-test fault conditions. For example, in the present embodiment, a self-test fault is equal to twice the scoring weight of one cross-test fault. The weighting of a unit's self-test more heavily than a cross-test reflects our observation that there is less likelihood of a failed computer unit erroneously reporting itself operational (healthy) pursuant to its self-test than the erroneous reporting of that same failed computer unit as being operational by a neighboring computer unit pursuant to a cross-test. Hence, the heavier weight accorded the self-test in the scoring scheme adds significant diagnostic information with only a slight increase in hardware. Thus, a unit having a negative self-test signal will score a double-fault (two faults) and thus have a higher total fault score than a unit having but one cross-test fault (one fault) against it. A unit may also develop a double-fault score by having two cross-test faults generated against it by the remaining pair of computer units.

(4) The history of previous fault conditions for the various units is automatically stored (memorized) and used in the fault scoring so that among units sharing an equally low fault score, the unit not having scored a prior fault condition will be selected over a presently healthy unit that has incurred one or more prior faults over a time period since the memory was last cleared (see paragraph 5 below).

(5) The fault history is reset when each of the plurality of computer units has incurred like fault conditions. If all of the units have had a previous fault within a given memory cycle (explained hereinafter), then the information as to earlier faults is no longer meaningful in making a selection and hence the memory is reset. In the disclosed embodiment, separate memories (latches) and associated reset circuits are used for the single- and double-fault scoring levels.

Now, in accordance with the preferred embodiment, the foregoing scoring and selection principles are advantageously implemented by a series of Boolean scoring algorithms that include the latching (memory) feature. These algorithms are then programmed into scoring logic ROM 30 in accordance with well-known logic design and logic programming procedures. To derive the Boolean relationships used in the disclosed embodiment, the self-test and cross-test fault conditions are identified by the notations shown in the matrix of FIG. 3. In FIG. 3, the fault signal identifiers (IDs) are represented by the two-digit combinations of 1, 1 (corresponding to a test by FCC #1 on FCC #1 or, in other words, a self-test); 1, 2 (corresponding to FCC #1's opinion of the health of FCC #2, or in other words, a cross-test by FCC #1 on FCC #2); 1, 3 (a cross-test by FCC #1 on FCC #3); and so on for the ID sets 2, 1; 2, 2; 2, 3; 3, 1; 3, 2; and 3, 3. Since the fault signals are in discrete form, a positive or healthy test is represented by the ID set i, j=0; and a fault condition by the ID set i, j=1.

Hence, with reference to FIG. 4, the single- and double-fault scoring equations are set forth in which Si (where i=1, 2 and 3) equals a Boolean relationship for all possible combinations of single-fault scores that can occur against each of the FCCs #s 1, 2, and 3. Similarly, the double-fault scores represented by Di (where i=1, 2, and 3) is equated with Boolean relationships for all the possible double-fault conditions that can be scored against each of the FCCs, #s 1, 2, and 3.

In the disclosed and preferred embodiment, the Boolean relationships shown in FIG. 4 not only incorporate the above-recited scoring and selection logic principles, but also include the following scoring features:

(6) A computer unit that has failed its self-test, will be unable to vote its cross-test against another unit. According to this feature, an FCC unit that fails its self-test is not considered reliable enough to give a valid cross-test and hence, such cross-tests are ignored in the scoring scheme. This qualification of a computer unit's cross-test against other units is done in circuit 10 and hence externally of the computer unit itself, so the qualification is independent of the unit's actual health.

(7) To prevent circuit 10 from being a single point failure, control switching circuit 44 reduces the four-bit selection word to two selection discretes having only four possible states and each of the these possible states is assigned to at least one control unit so that a selection is made regardless of the failure modes of circuit 10.

Hence, referring to the Boolean relationships of FIG. 4, the Boolean equation for a single-fault on FCC #1 is derived in the following manner. The plus signs (+) in the relationships represents OR logic functions; and (·) represents an AND logic function. The term $(\overline{2,2}\cdot 2,1)$ represents the Boolean result of a healthy self-test for FCC #2 (i.e., not 2,2=1), AND a negative cross-test by FCC #2 against FCC #1 (i.e., 2,1=1). The term $(\overline{3,3}\cdot 3,1)$ represents the Boolean term of a positive self-test for FCC #3 AND a negative cross-test by FCC #3 against FCC #1. The final term $(S1'\cdot \overline{RS})$ represents the latched or memory condition of circuit 33 (see FIG. 2) for a previous fault score of S1 (noted as S1'), where the latches have not been reset (hence, not RS). In other words, this final term of $(S1'\cdot \overline{RS})$ is the latched fault score for FCC #1 which will be stored by the latch until a reset signal represented by RS occurs to reset the single-fault score latches 32b in accordance with the above-described operating principles. The Boolean relationships for the remaining single-fault scores for FCCs #s 2 and 3 are similarly derived.

With reference to the double-fault equation for FCC #1, D1 includes a term (1, 1) which represents the self-test fault signal for FCC #1; and a term $(\overline{2, 2\cdot 2}, 1\cdot 3, \overline{3\cdot 3}, 1)$ that represents the concurrence of cross-fault scores against FCC #1 in which both FCC #2 and FCC #3 have positive self-tests. The final Boolean term in the double-fault scoring equation for D1 is $(D1'\cdot \overline{RD})$ and represents a previous fault state of D1 (namely D1') in the absence of a reset signal RD resetting the double-fault scoring latches 32b (see FIG. 2).

With reference to FIG. 5, the latched fault scores S1, S2, S3, D1, D2, and D3, generated in accordance with the foregoing Boolean relationships form a multibit fault-scoring word representing the comparative health of the plurality of FCCs and having 27 different possible states that occur as the result of varying permutations of the individual self-test and cross-test fault inputs. These states are now converted into a binary selection word in accordance with the above-stated selection logic rules. These rules are implemented by the selection logic ROM 42 of circuit 10b described above in connection with FIG. 2.

Beginning at the top of the column (in FIG. 5), the lowest possible fault score state is shown with zero for all bits D3, D2, D1, S1, S2, S3, and represents a health status in which none of the FCCs have either a single- or a double-fault score, nor a previous history of single or double faults. Thus, none of the FCCs need be excluded from controlling the system. Conversely, any one of the three FCCs can be selected. Going down the column, the second state of the fault-scoring word occurs when the latched fault score bit S1=1 and the remaining bits are 0, corresponding to a single-fault condition against FCC #1; hence FCC #1 is to be excluded and either FCC #s 2 or 3 selected. In the third state down, bit S2 of the fault score word is 1 and the remaining bits 0, so that FCC #2 is to be excluded and either FCC #1 or #2 is to be selected. Similarly, the remaining states of the six-bit fault-scoring word are associated with selection conditions in which none, one, or two of the FCCs are not allowed to be selected as indicated by the second column in the table of FIG. 5. Note that the latched fault scores in the left-hand column of the table in FIG. 5 include "don't care" bits represented by Xs that correspond to fault score states in which one or more of the FCCs has scored a double fault. In this embodiment, when a computer unit has scored a double fault, the unit is presumed bad, and the additional score of a single fault against that same computer unit is not considered significant and is hence ignored.

The third column in the table of FIG. 5 shows the conversion process performed by the selection logic of ROM 42 to translate the six-bit fault-scoring word in the left-hand column to a four-bit selection word consisting of B1, B2, B3, and B4 that establishes which of the three FCCs is to be selected. For design and operational flexibility, the selection logic output of the four-bit words B1, B2, B3, and B4 includes a number of different states that ultimately result in the selection of the same FCC. This is illustrated by referring to the column of hexadecimal values for the selection output words and noting that the pair of hexadecimal values B and A result in the selection of FCC #1; the pair D and 9 select FCC #2; and the pair E and 7 select FCC #3. Control switching circuit 44 receives the four-bit selection logic output of B1 through B4 and generates the two-bit control selection discretes C1, C2, in accordance with the decode selection logic table shown at the bottom of FIG. 5. It is observed that the pair of control discretes C1 and C2 provide four different selections and in order to ensure that one of the FCCs is always selected, two of the four possible states of C1 and C2 are used to select FCC number 3 as indicated.

It is observed that certain states of the fault score and selection words correspond to fault conditions that do not require a change in the output discretes from switching circuit 44. These states are represented by the selection word value of bits B1 through B4 all being 1, which in turn correspond to latched fault scores in which none of the FCCs are excluded and conversely, all three FCCs are suitable for being selected. Thus, any time the selection word assumes this state (corresponding to the hexadecimal value of F), the output bits C1, C2 of control switching circuit 44 will remain unchanged. Note that these no-switching states occur when all of the single-fault and double-fault scores are positive (no fault); when all three of the single-fault latch scores are negative, representing a condition in which each FCC has received one negative cross-test from another FCC and thus rendering all three FCCs sharing the lowest available fault score; and a state in which all three of the double-fault scores are negative such that the three FCCs again share the lowest available fault score. In each of these situations, the FCC previously in control remains in control inasmuch as the fault scores do not point to one FCC as being more healthy than the others.

In the disclosed embodiment, the scoring logic ROM 30 is programmed according to the Boolean relationships of FIG. 4 using well known logic design and programming techniques. For example, reference is made to "Digital Computer Design Fundamentals" by Yao-han Chu, McGraw-Hill, 1962; and "Microcomputer-Based Design" by John B. Peatman, McGraw-Hill, 1977, which are expressly incorporated herein by reference.

Similarly, the binary signal conversions or translations according to the scoring and selection columns of FIG. 5 are readily implemented in selection logic ROM 42 using logic design and programming techniques such as taught in the above reference.

It is observed that the scoring logic ROM 30 and selection logic ROM 42, although memory devices, are used in circuit 10 for implementing the scoring and selection logic, and not for memory of the input test signals or resulting fault scores. The memory function of circuit 10 is performed by the latching circuit 32.

Also, it will be noted that the scoring logic and selection logic in accordance with the foregoing principles, can be implemented by other types of logic circuitry, including discrete logic components, programmable logic arrays, and special-purpose integrated logic circuits. The design and programming of such circuitry based on the above-described Boolean relationships of FIG. 4 and the conversion Table of FIG. 5 can be readily performed using well known logic design techniques. However, the use of ROMs 30 and 42 is preferred for these logic relationships because of the inherent reliability of ROMs compared to other types of logic circuitry.

Self- and Cross-Tests

Self-testing of special and general-purpose computers is well known. In the case of FCC computers, which are known per se, a self-testing procedure suitable for use with the present invention is to instruct all of the redundant FCCs #s 1, 2, and 3 to perform identical tests on copies of a common computed databank in which the tests are performed in parallel. After successfully completing the self-test, each FCC is caused to cycle its self-test timeout timer 18 (1, 2, and 3) (see FIG. 1) so that the timer continues to produce a self-test discrete representing a healthy state, or, in this instance, a discrete bit value of 0. If an FCC fails its self-test, it will be unable, pursuant to the self-test routine, to reset its timeout timer and the timer will automatically lapse and change the output discrete to 1 representing a faulty condition. The duration of the timing cycle is a matter of design choice that depends on the system being controlled. The advantage of recycling a timeout timer, as opposed to requiring the FCC to produce a discrete signal representing an output state of the self-test, is that if the FCC fails, it may not be able to produce the discrete signal that will declare itself faulty. On the other hand, the use of a timeout timer as a separate discrete circuit at the interface of the FCC and circuit 10 (see FIG. 1) allows circuit 10 to assume that the FCC has failed its self-test if the corresponding timer is not reset in time and hence times out. Self-testing and the use of self-test timers are known per se as will be recognized by those familiar with this art.

Cross-testing, suitable for use with the disclosed embodiment of circuit 10 can be performed in several different ways. One suitable cross-test is to instruct the source FCC to execute the control law software itself, then exchange control commands across inter-FCC link 21, and compare the source FCC's command results to the command results generated by the tested FCC.

A simpler and preferred cross-test for the present embodiment of circuit 10 is to instruct a source FCC to request another FCC to perform a standard, relatively simple, program for which the answer has been predetermined and stored in the source FCC. The return of an incorrect answer by the tested FCC indicates a failure. Again, such cross-testing is known per se, as will be recognized by those familiar with this art. The frequency of the cross-testing is, as in the case of the self-testing, a design choice.

Applications

Figure 6:
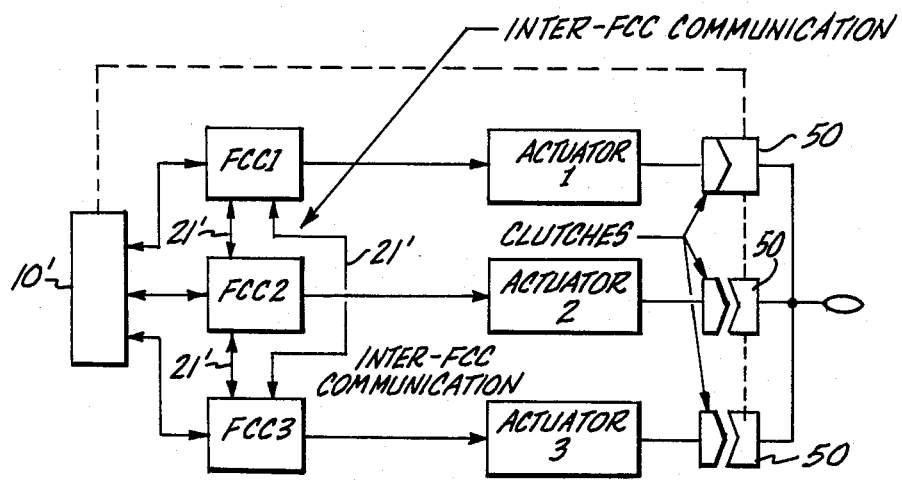
FIGS. 6, 7 and 8 are examples of various architectures of redundant control systems incorporating the fault scoring and selection logic circuit of FIGS. 1 and 2.
Figure 7:
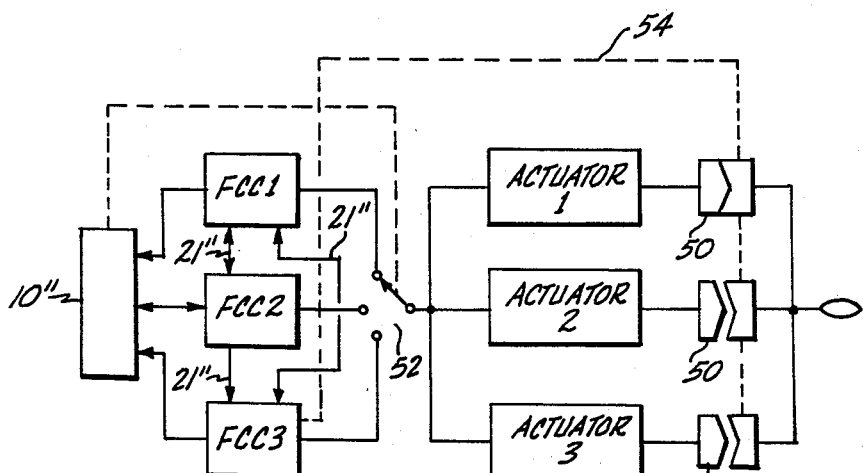
Figure 8:
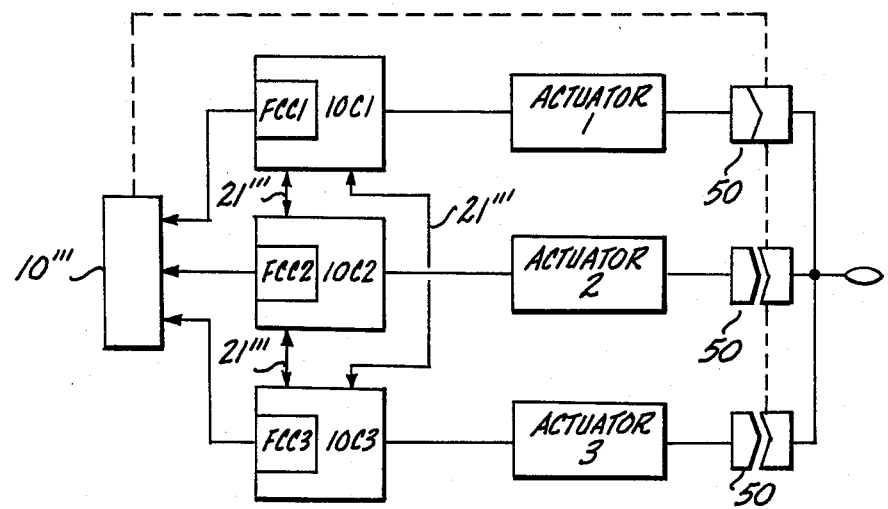

To illustrate several exemplary applications of the fault scoring and selection logic circuit 10, reference is made to FIGS. 6, 7, and 8. For clarity, the sensor inputs to the various FCCs shown in these FIGURES have been omitted, but the actuator outputs and the associated actuators of the aircraft systems (compare with FIG. 1) are shown. FIG. 5 uses an inter-FCC communication link 21' to enable computer synchronization, fault detection and, while not shown, for managing redundant sensors. The self- and cross-tests generated by the FCCs are connected to circuit 10' corresponding to the above-disclosed fault scoring and selection logic circuit 10 of FIGS. 1 and 2. The output of circuit 10' is shown as a dotted line coupling a plurality of clutches 50 which are selectively engaged in accordance with the FCC selection output leads 22 of circuit 10 of FIGS. 1 and 2. Thus, the selection of an FCC for controlling the system will be accompanied by the corresponding one of clutches 50 being engaged so that the associated actuator will operate through the engaged clutch in response to the selected FCC.

FIG. 7 illustrates a different architecture in which the selection signal produced by a fault scoring and selection logic circuit 10" not only selects one of the available FCCs, but also operates a selection switch 52 connected between the FCC outputs and the three actuator channels with a common pole of the switch jointly connected to all three actuator channels. Thus, the selected FCC acting through the correspondingly positioned switch 52 operates through all three actuator channels. The effective actuator channel or channels are determined by the engagement of selected clutches 50 that are selected directly by the FCC in control over a linkage indicated by dotted line 54.

In the configuration of FIG. 8, each FCC has an associated input/output unit as indicated by IOC1, IOC2, and IOC3. The IO units receive sensor data and send out actuator commands; also the IO units are responsible for autonomous inter-FCC communication. This means that an FCC can send commands to an actuator in another channel without relying on the FCC of that other channel to be healthy. The FCC-in-control selection, including the selective engagement of clutches 50, is similar to the FIG. 6 architecture.

In summary, fault scoring and selection logic circuitry and method for redundant control units are provided. Self-test and cross-test fault-indicating signals are combined in a scoring logic scheme by which the self-test and cross-test faults are differently weighted, combined into a score for each of a plurality of redundant control units, such as computers, and compared by selection logic that in turn generates a control unit selection signal based on the lowest available fault score. Preferably, the self-test fault-indicating signals are accorded greater weight in the scoring logic scheme than cross-tests. Furthermore, in the preferred embodiment, a history of previous fault conditions is stored and the scoring logic scheme incorporates these memorized fault conditions so that the scoring logic generates a control unit selection signal based on the past history of failures of the control units as well as their present fault scores. The memory of previous fault scores is reset under certain conditions to allow recovered units to participate as healthy units.

While the invention has been illustrated in a preferred embodiment based on a fault-scoring scheme in which the self-test fault signals are accorded twice the weight of single cross-test faults, it will be appreciated that other weighting schemes are contemplated. For example, in certain applications a self-test fault indication may be assigned a weighting of 1½ times that of a single cross-test fault such that when the scores are accumulated and combined, a self-test fault will score higher than a single cross-test fault, but the accumulation of two cross-test faults will score higher than a single self-test fault condition when registered against a given control unit.

Also, it will be appreciated that the disclosed triplex system is but one example of an implementation of the scoring logic and selection logic. The circuitry and method of the invention are adaptable to any plurality of two to N control units. For example, in an embodiment incorporating four redundant control units, self-test and cross-test signals are produced by the plurality of four units and the scores combined in the scoring logic. A selection signal is generated by selection logic in which a unit is selected based as above on the lowest available fault score. The scoring logic in such a fourplex system can be based on a maximum of a double (two) fault score against any given control unit as in the case of the triplex system described above, or can be based on an additional scoring level of a triple (three) fault score. In the latter example, a control unit having a double-fault score based on the accumulation of two single-fault cross-tests against it, might be selected as the lowest fault-scoring control unit when the remaining three control units have scored a triple fault based on various possible combinations of cross-test and self-test fault conditions. Similarly, the scoring logic and selection logic circuitry and method can be expanded within these principles to any level N of redundancy.

Additionally, while the disclosed embodiment causes a selection of but one control unit in response to the various possible fault conditions, other applications of the invention may provide that a plurality of control units be selected for joint, concurrent control of the system and the scoring and selection logic circuitry adapted to selectively exclude (deselect) a control unit or units from joint control in response to the developed fault scores.

Thus, while only particular embodiments have been disclosed herein, it will be readily apparent to persons skilled in the art that numerous changes and modifications can be made thereto, including the use of equivalent means, devices, and method steps without departing from the spirit of the invention.

The embodiments of the invention in which an exclusive property or privilege is claimed are defined as follows:

1. A fault scoring and selection circuit for selectively enabling at least one of a plurality of redundant control units to govern the operation of controlled equipment in which the redundant control units are each of the type having both self-testing and cross-testing capabilities respectively producing self-test and cross-test fault signals, said circuit comprising:

fault-scoring logic circuit means including means for receiving self-test and cross-test fault signals from each of said control units, and means assigning predetermined scoring weights, certain of which are different, to said self-test fault signals and cross-test fault signals, and means for combining these weighted fault signals to produce combined fault score signals representing the health of each of said control units; and selection logic circuit means for receiving said fault score signals, and for converting said fault score signals into a selection output signal that selects at least one of said control units having the lowest available fault score as determined by said fault score signals.

2. The fault scoring and selection circuit of claim 1 wherein said self-test fault signals are each a discrete signal indicating that the corresponding control unit has either failed or not failed its self-test; and wherein said cross-test fault signals are each discrete signals representing either a failed or nonfailed condition of one of the control units as cross-tested by another of said control units; and said fault-scoring logic circuit means including means for receiving said self-test and cross-test fault signals in discrete form.

3. The fault scoring and selection circuit of claim 1 wherein said selection logic circuit means comprises means for producing said selection output signal so that said selection output signal selects one of said control units from among those having the lowest available fault score.

4. The fault scoring and selection circuit of claim 1 wherein said means assigning predetermined scoring weights comprises means for assigning a different scoring weight to said self-test fault signals than the scoring weight assigned to said cross-test fault signals.

5. The fault scoring and selection circuit of claim 4 wherein said means assigning said predetermined scoring weights comprises means for assigning a greater scoring weight to each of said self-test fault signals than the predetermined scoring weight assigned to each of said cross-test fault signals.

6. The fault scoring and selection circuit of claim 5 wherein said means assigning predetermined scoring weights comprises means for assigning a scoring weight to each of said self-test fault signals that is twice the predetermined scoring weight assigned to each of said cross-test fault signals such that a subject control unit that has two cross-test faults signalled against it by other control units will have the equivalent of a score resulting from the subject control unit having a failed self-test.

7. The fault scoring and selection circuit of claim 1 in which said fault-scoring logic circuit comprises memory means for storing the state of said fault score signals for each of said control units, said selection logic circuit means being coupled to said memory means for receiving said stored fault score signals so that said selection output signal is produced by said selection logic circuit means in response to previous and present fault scores.

8. The fault scoring and selection circuit of claim 7 wherein said memory means comprises a first memory circuit for storing the state of said fault score signals for each of said control units that results from a single cross-test fault signal, and a second memory circuit for storing the states of said fault score signals for each of said control units that result from a combination of said self-test fault signal or two or more cross-test fault signals being produced against each of said control units.

9. The fault scoring and selection circuit of claim 7 further comprising reset means responsive to said selection logic circuit means and said memory means for resetting said memory means, said reset means being activated in response to a combination of stored fault score signals corresponding to all of said control units having an equal fault score history.

10. The fault scoring and selection circuit of claim 8 further comprising first reset means associated with said first member circuit and second reset means associated with said second memory circuit, said first and second reset means being responsive to said selection logic circuit means and said first and second memory circuits, respectively, such that said first reset means resets said first memory circuit in response to a combination of stored fault score signals corresponding to all of said control units having a single cross-test fault scored against them, and so that said second reset means resets said second memory circuit in response to a combination of stored fault score signals corresponding to all of said control units having a fault score corresponding to a failed self-test or a combination of two cross-test faults.

11. The fault scoring and selection circuit of claim 1 wherein said means assigning predetermined scoring weights to said self-test fault signals and said cross-test fault signals of said fault-scoring logic circuit means comprises means for assigning a single fault scoring weight to each of said cross-test fault signals and a double-fault scoring weight to each of said self-test fault signals, and said means for combining these weighted fault signals comprises means for producing a single fault-scoring signal for each subject control unit in response to one cross-test fault signal indicating a failed condition produced by any of the other control units against the subject control unit, and for producing a double fault-scoring signal for each subject control unit in response to either a failed self-test fault signal from the subject control unit, or two or more cross-test fault signals received from the other control units indicating a failed condition of the subject control unit.

12. The fault scoring and selection circuit of claim 1, in said fault-scoring logic means, said means for combining comprises means for disregarding cross-test fault signals produced by control units that have themselves produced a failed self-test fault signal.

13. The fault scoring and selection circuit of claim 1 wherein said selection logic circuit means comprises means for comparing said fault score signals and when two or more control units share the lowest available fault score, then causing one of these indicated control units to be selected according to predetermined, arbitrary selection rules to ensure that a positive selection of at least one unit is made.

14. The fault scoring and selection circuit of claim 1 wherein said selection logic circuit means comprises means for maintaining the state of said selection output signal unless said fault score signals indicate that a control unit having a lower fault score is available, whereby unnecessary selection switching between control units is avoided.

15. The fault scoring and selection circuit of claim 1 wherein said fault-scoring logic circuit means includes means for producing a multibit binary scoring signal represented by the bits S1, S2, S3, D1, D2 and D3 that is derived from the following set of Boolean relationships:

$S1 = (\overline{2, 2\cdot 2}, 1) + (\overline{3, 3\cdot 3}, 1)$
$S2 = (\overline{1, 1\cdot 1}, 2) + (\overline{3, 3\cdot 3}, 2)$
$S3 = (\overline{1, 1\cdot 1}, 3) + (\overline{2, 2\cdot 2}, 3)$
$D1 = (1, 1) + (\overline{2, 2\cdot 2}, 1\cdot 3, \overline{3\cdot 3}, 1)$
$D2 = (2, 2) + (\overline{1, 1\cdot 1}, 2\cdot 3, \overline{3\cdot 3}, 2)$
$D3 = (3, 3) + (\overline{1, 1\cdot 1}, 3\cdot 2, \overline{2\cdot 2}, 3)$ wherein S1, S2 and S3 are single-fault scores against first, second and third control units, respectively; D1, D2 and D3 are double-fault scores against said first, second and third control units, respectively; and the notation set i,j where i=1, 2 or 3 and j=1, 2 or 3, correspond to fault signal identifiers in which 1, 1 is the self-test of the first control unit; 1, 2 is the cross-test by the first control unit against the second control unit; 1, 3 is the cross-test by the first control unit against the third control unit; 2, 1 is the cross-test by the second control unit against the first unit; 2, 2 is the self-test of the second unit; 2, 3 is the cross-test by control unit 2 against unit 3; 3, 1 is the cross-test by control unit 3 against unit 1; 3, 2 is the cross-test by the third control unit against the second unit; and 3, 3 is the self-test against the third control unit and wherein these fault sets, and in which the set i,j equals a binary one when the test signal indicates a failure and equals a binary zero when the test indicates a nonfailed condition.

16. The fault scoring and selection circuit of claim 15 wherein said fault-scoring logic circuit means comprises a first memory means for storing the state of single-fault score signals for each of said control units and a second memory circuit means for storing the state of double-fault score signals for each of said control units, said selection logic circuit means being coupled to said memory means for receiving said stored fault score signals so that said selection output signal is produced by said selection logic circuit means in response to previous (stored) and present fault scores; and further comprising first and second memory reset means, said first memory reset means resetting said first memory circuit means in response to a combination of stored fault score signals corresponding to all of said control units having a single-fault score (S1=1, S2=1 and S3=1), and said second reset means for resetting said second memory circuit memory means in response to a combination of stored fault score signals corresponding to all of said control units having a double-fault score (D1=1, D2=1 and D3=1); and wherein said single-fault binary bit conditions S1, S2 and S3 are produced in accordance with the following Boolean relationships:

$S1 = (\overline{2, 2\cdot 2}, 1) + (\overline{3, 3\cdot 3}, 1) + (S1'\cdot \overline{RS})$
$S2 = (\overline{1, 1\cdot 1}, 2) + (\overline{3, 3\cdot 3}, 2) + (S2'\cdot \overline{RS})$
$S3 = (\overline{1, 1\cdot 1}, 3) + (\overline{2, 2\cdot 2}, 3) + (S3'\cdot \overline{RS})$ wherein the term S1' represents a previous (stored) single-fault score for the first control unit, S2' represents a previous (stored) single-fault score for the second control unit, and S3' represents a previous (stored) single-fault score for the third control unit, and the term $\overline{RS}$ represents the nonresetting of said first memory circuit means by said first reset circuit; and wherein the double-fault scoring bits D1, D2 and D3 are derived from the following Boolean relationships:

$D1 = (1, 1) + (\overline{2, 2\cdot 2}, 1\cdot 3, \overline{3\cdot 3}, 1) + (D1'\cdot \overline{RD})$
$D2 = (2, 2) + (\overline{1, 1\cdot 1}, 2\cdot 3, \overline{3\cdot 3}, 2) + (D2'\cdot \overline{RD})$
$D3 = (3, 3) + (\overline{1, 1\cdot 1}, 3\cdot 2, \overline{2\cdot 2}, 3) + (D3'\cdot \overline{RD})$ wherein the term D1' represents a previous (stored) double-fault bit state for the first control unit, D2' represents a previous (stored) double-fault bit state for the second control unit and D3' represents a previous (stored) double-fault state for the third control unit, and $\overline{RD}$ represents the nonresetting of said second memory circuit means by said second reset circuit.

17. The fault scoring and selection circuit of claim 16 wherein said selection logic circuit means includes means responsive to said multibit scoring word of S1, S2, S3, D1, D2 and D3 to produce a two-bit binary selection signal that selects one of said plurality of control units.

18. The fault scoring and selection circuit of claim 1 wherein said fault-scoring logic circuit means comprises a read-only memory (ROM) programmed to produce said combined fault score signals in response to said self-test and cross-test fault signals.

19. The fault scoring and selection circuit of claim 1 wherein said selection logic circuit means comprises a read-only memory (ROM) that is programmed to receive said fault score signals and to convert said fault score signals into said selection output signal.

20. The fault scoring and selection circuit of claim 19 wherein said fault scoring logic circit means comprises resettable latches coupled to said read-only memory for storing the state of said fault score signals for each of said control units, and further comprises reset circuit means for resetting said latches in response to a predetermined combination of stored fault score signals.

21. A redundant computer control system for reliable operation of computer-controlled equipment comprising in combination:
a plurality of redundant computer units, each of said computer units including means for producing a self-test fault signal in discrete format indicating either a faulty or nonfaulty self-test state, and means for producing a plurality of cross-test fault signals in discrete format, one such cross-test fault signal being produced for each other of said plurality of computer units and indicating that such other control unit has either a faulty or nonfaulty state;
fault scoring and selection circuitry for selectively enabling at least one of said plurality of computer units to control the equipment, said fault scoring and selection circuitry comprising:
fault-scoring logic circuit means including means for receiving said self-test and cross-test fault signals and means for assigning predetermined scoring weights, certain of which are different, to said self-test fault signals and to said cross-test fault signals, and means for combining these weighted fault signals to produce combined fault score signals representing the health of each of said computer units; and
selection logic circuit means for receiving said fault score signals, and for converting said fault score signals into a selection output signal that selects at least one of said computer units that has the lowest available fault score as determined by said fault score signals.

22. A method of selecting at least one of a plurality of redundant control units to govern the opeation of controlled equipment by automatic fault scoring and selection logic, in which each of the plurality of redundant interlinked control units is of the type capable of producing both a self-test discrete signal representing a failed or nonfailed self-test and cross-test discrete signals corresponding to failed or nonfailed conditions of the other control units, comprising the combination of steps of:
receiving and scoring the self-test and cross-test discrete signals from said control units by assigning predetermined scoring weights, certain of which are different, to said self-test fault signals and to said cross-test fault signals, and combining these weighted fault signals to produce combined fault score signals representing the health of each of said control units; and
selecting at least one control unit by comparing said combined fault score signals in accordance with predetermined selection logic, and responsively producing a selection output signal that selects at least one of said control units having the lowest available fault score as determined by said fault score signals.

23. The method of claim 22 wherein said step of assigning said predetermined scoring weights comprises the substeps of assigning a different and greater scoring weight to said self-test fault signals than the predetermined scoring weight assigned to said cross-test fault signals.

24. The method of claim 22 further comprising the step of storing in memory, the fault score signals produced by the step of receiving and scoring said self-test and cross-test signals, and wherein the step of selecting comprises the substeps of producing said selection output signal in response to the stored fault score signals so that said selection output signal is responsive to both previous and present fault scores.

25. The method of claim 24 wherein said step of storing the fault score signals in memory comprises the addition step of resetting said memory in response to a combination of stored fault score signals corresponding to all of said computer units having a like fault score history.

* * * * *